US006279206B1

United States Patent
Jin

(10) Patent No.: US 6,279,206 B1
(45) Date of Patent: Aug. 28, 2001

(54) APPARATUS FOR DISMANTLING A WEATHER STRIP FROM THE DOOR OPENING OF A DISUSED AUTOMOBILE

(75) Inventor: Cheol Min Jin, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/444,915

(22) Filed: Nov. 24, 1999

(30) Foreign Application Priority Data

Jun. 3, 1999 (KR) .................................................. 99-20371

(51) Int. Cl.[7] ...................................................... B23P 11/02

(52) U.S. Cl. .............................................................. 24/235

(58) Field of Search ............................. 29/235, 451, 450, 29/430, 701, 426.1, 426.4, 426.5, 426.6

(56) References Cited

U.S. PATENT DOCUMENTS 4,839,958 * 6/1989 Angelo et al. ......................... 29/235

* cited by examiner

Primary Examiner—Robert C. Watson
(74) Attorney, Agent, or Firm—Birch, Stewart, Kolasch & Birch, LLP

(57) ABSTRACT

The present invention relates to an apparatus for dismantling a weather strip from the door opening of a discarded automobile. The apparatus comprises a main control body, a working arm pivotally mounted on the main control body, a weather strip remover mounted at the end of the working arm, the weather strip remover pulling the weather strip and detaching it from the body of the automobile, an arm supporter supporting the main control body relative to the door frame of the automobile; and a movable means for transporting the body with the weather strip remover and the working arm to the working area. The weather strip of the door opening is automatically removed from the discarded automobile, thereby reducing cost and labor hours and allowing for recycling of the rubber.

3 Claims, 4 Drawing Sheets

APPARATUS FOR DISMANTLING A WEATHER STRIP FROM THE DOOR OPENING OF A DISUSED AUTOMOBILE

BACKGROUND OF THE INVENTION

FIELD OF THE INVENTION

The present invention relates to a system for recycling the components dismantled from a discarded automobile and more particularly, to an apparatus for automatically dismantling a weather strip mounted on the door opening of a discarded automobile, which can save cost and labor hours.

Generally, the body of the discarded automobile is melted in a furnace and recycled as reclaimed material. According to the traditional method of dismantling the discarded automobile, metal parts, resin parts like an instrument panel and tires are dismantled from the automobile before the body of the discarded automobile is mechanically compacted and inserted into a furnace.

Rubber articles such as a weather strip cannot be effectively recycled according to developed rubber recycling technology.

Until now, when dismantling the discarded automobile, rubber articles such as weather strips mounted at the edges of the door opening and the door are not collected for recycling because of the substantial difficulty and cost in collecting the weather strip etc. from the discarded automobile.

SUMMARY OF THE INVENTION

The object of the present invention is to provide an apparatus for automatically dismantling a weather strip from a door opening of an automobile, before compacting the body of the discarded automobile, thereby reducing compacting cost and labor hours.

To achieve the above object, the present invention comprises a main control body, a working arm pivotally mounted on the main body, a weather strip remover mounted at the end of the working arm, for pulling the weather strip and detaching it from the body of the automobile, an arm supporter supporting the body to the main body of the automobile door frame; and a movable means transporting the main body with the weather strip remover and the working arm to the working location.

The weather strip remover comprises a weather strip holder pivotally mounted on the end of the working arm for holding an end of the weather strip and pulling it, a motor mounted on the end of the working arm for pivoting the weather strip holder, and a cover covering the weather strip holder.

BRIEF DESCRIPTION OF THE DRAWINGS

The above object and other advantages of the present invention will become more apparent by describing in detail the preferred embodiment of the present invention with reference to the attached drawings in which:

FIG. 4 shows the dismantling process using the apparatus in accordance with the present invention;

DETAILED DESCRIPTION OF THE INVENTION

Figure 1:
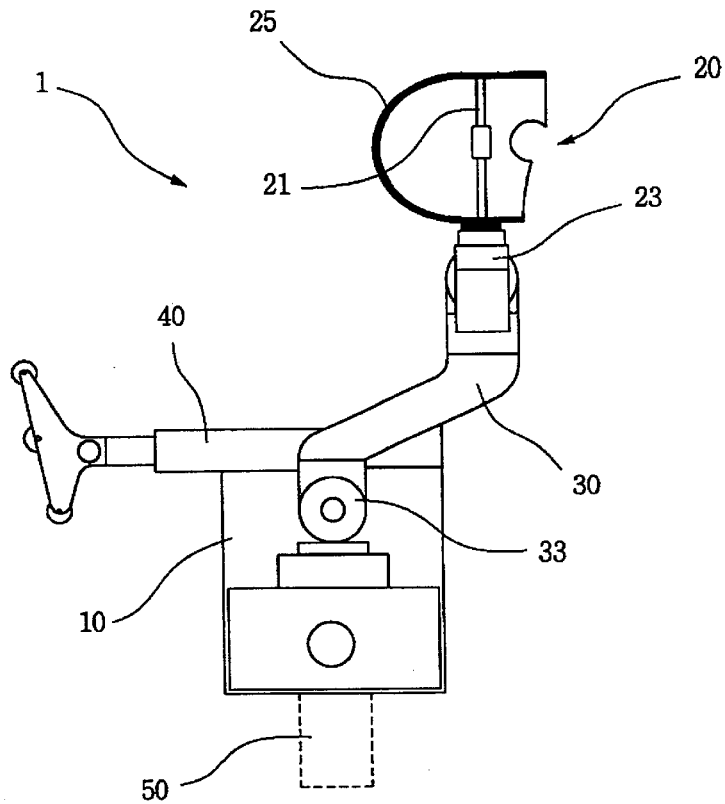
FIG. 1 is a plant view of the apparatus in accordance with the present invention.
Figure 2:
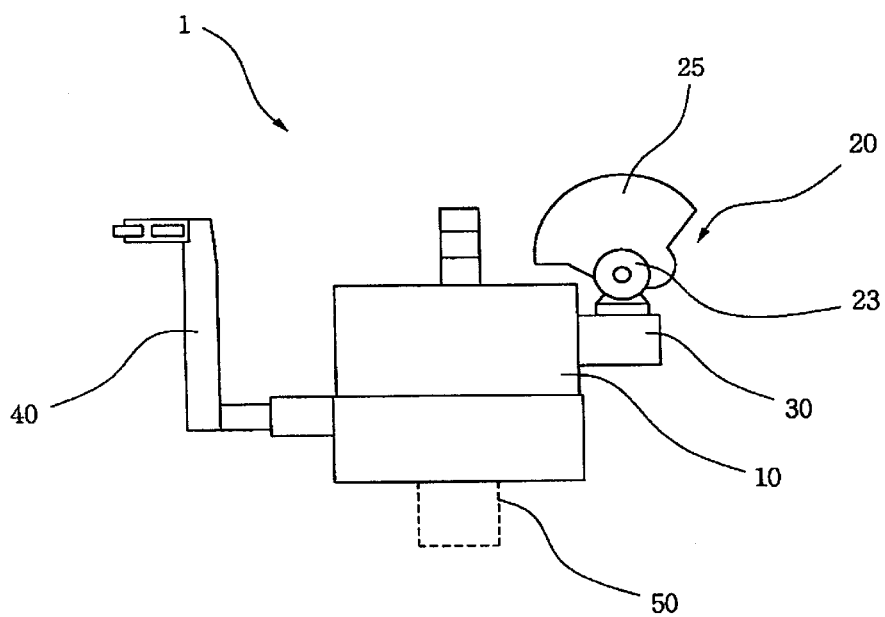
FIG. 2 is a side view of the apparatus in accordance with the present invention.
Figure 3:
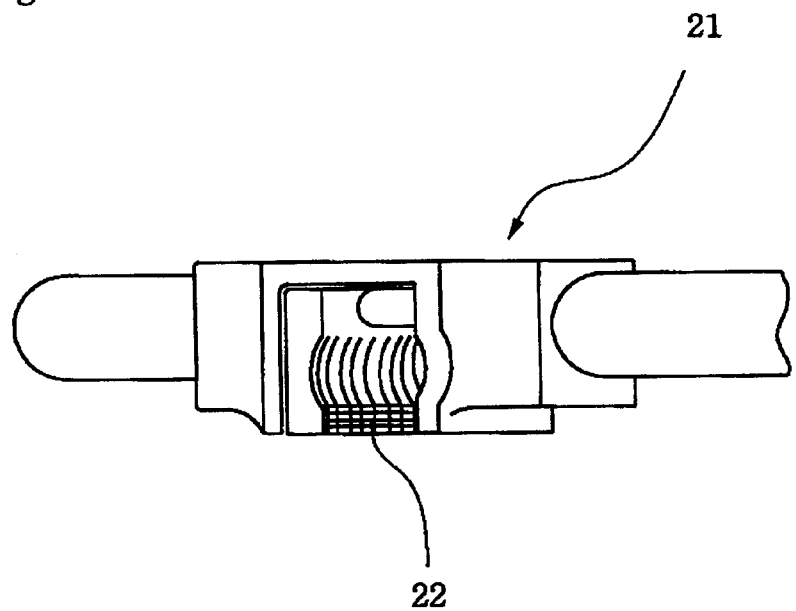
FIG. 3 is an enlarged schematic diagram of a weather strip holder.

FIG. 1 through FIG. 4 shows an embodiment of the door opening weather strip for dismantling device 1 in accordance with the present invention. The weather strip dismantling device 1 comprises a main body 10 having a control part, a working arm 30 connected with the main body 10, a weather strip remover 20 mounted at the end of the working arm 30, an arm supporter 40 supporting the main body 10 to the door frame of the automobile, and a movable means 50 transporting the main body 10 to the working location.

The weather strip remover 20 pulls and removes a weather strip 105 mounted at the edge of the automobile door opening 102, the weather strip remover comprising a weather strip holder 21 pivotally mounted on the end of the working arm 30 for holding an end of the weather strip 105 and pulling it, a motor 23 mounted on the end of the working arm 30 for pivoting the weather strip holder 21, and a cover 25 covering the weather strip holder 21.

The weather strip holder 21 has a jig 22 which can firmly hold an end of the weather strip 105 and wind it on the body of the holder 21, while the motor 23 is operating.

The working arm 30 is folded with two arm elements that are connected pivotally, through which the arm motor 33 makes the weather strip remover 20 turn around 180° about the main body 10. An end of the working arm 30 is connected with the main body 10 through an arm motor 33, and the other end of the working arm 30 is connected with the weather strip holder 21 through the motor 23, therefore the working radius of the weather strip holder 21 is restricted by the length of the working arm 30.

The arm motor 33 mounted on the body 10 is set to operate at a constant speed of 50 rpm and its torque is transmitted to the working arm 30. The arm supporter 40 supports the main body 10 to the door frame of the automobile when the door 103 is opened.

The movable means 50 transporting the main body 10 with the weather strip remover 20 and the working arm 30 to the door opening 102 of the discarded automobile is positioned on both sides of the dismantling line. The movable means 50 moves at a speed of 500 mm/min when approaching the automobile and moves at a speed of 300 mm/min when returning to the starting point.

Next, the working process for dismantling the weather strip of the door opening will be described.

Figure 4A:
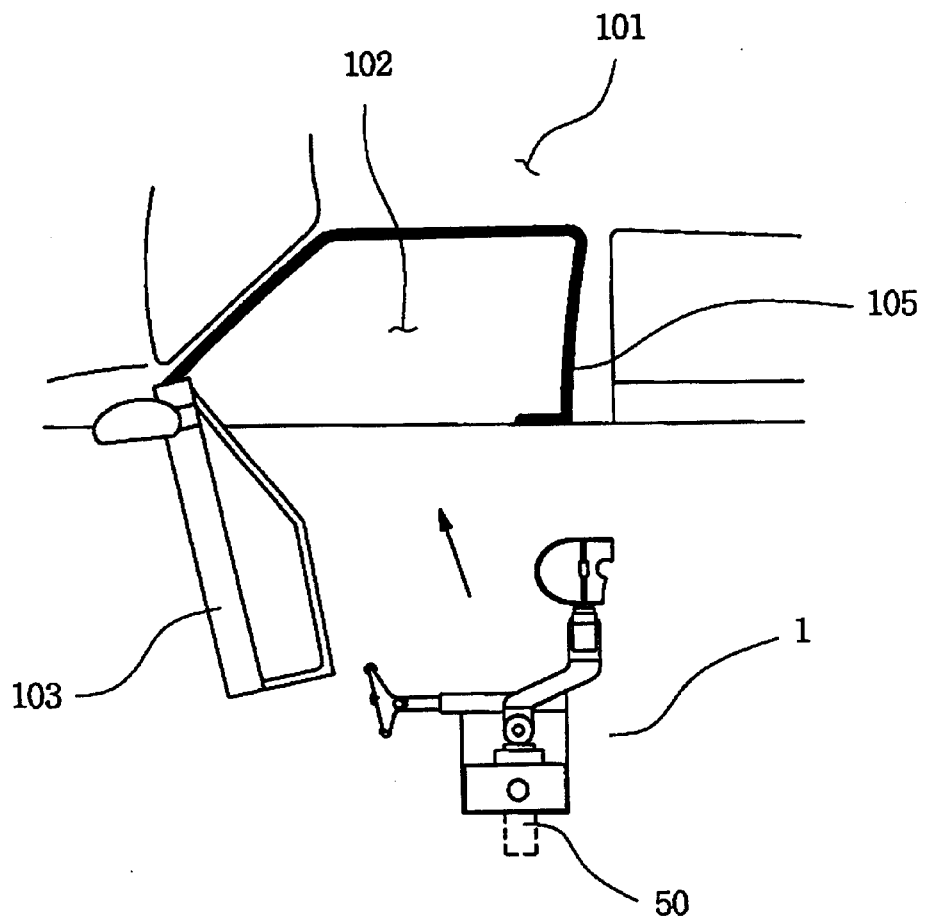
FIG. 4a shows the state that the disused automobile is approaching the door opening of the disused automobile.

Firstly, recycling elements such as the hood panel, wiper assembly, and cowl top cover are removed from the discarded automobile transported to the working position. Thereafter, as shown in FIG. 4a, the movable means 50 transports the main body 10 with the weather strip remover 20 to the door opening 102.

Figure 4B:
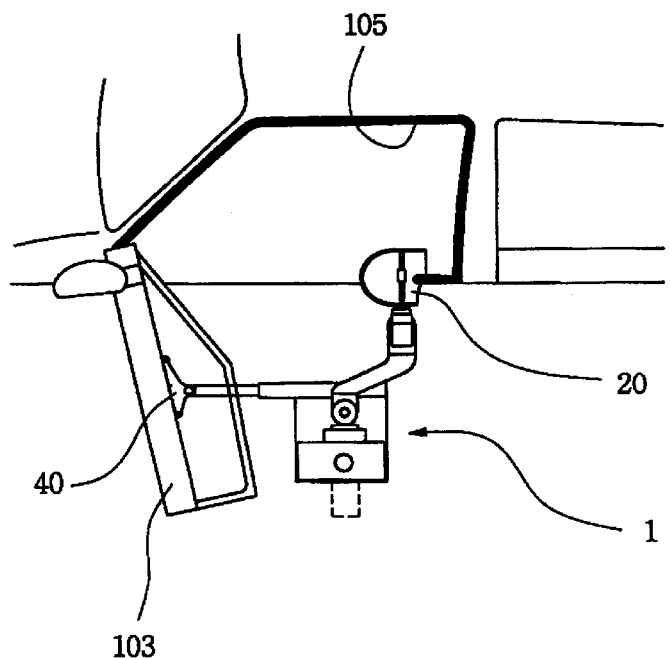
FIG. 4b shows the state that a weather strip remover of the apparatus in accordance with the present invention is positioned on the weather strip.

At this state, the arm supporter 40 is extended and supports the main body 10 to the frame of the automobile behind the door 102. The weather strip remover 20 is, as shown in FIG. 4b, moved into position relative to the weather strip 105 in the door opening 102.

Figure 4C:
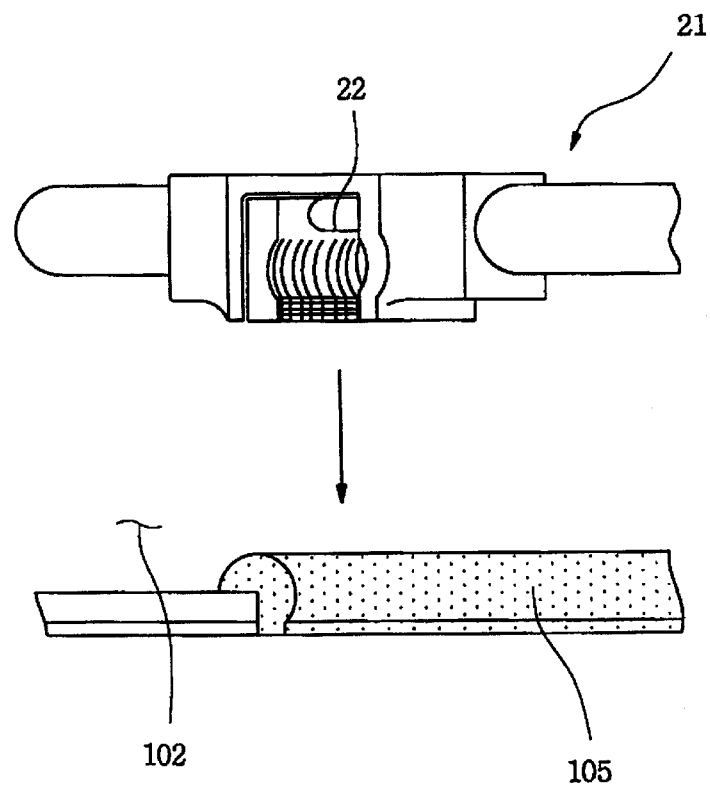
FIG. 4c and FIG. 4d show the states that the weather strip is jointed with a jig provided on the apparatus in accordance with the present invention respectively.
Figure 4D:
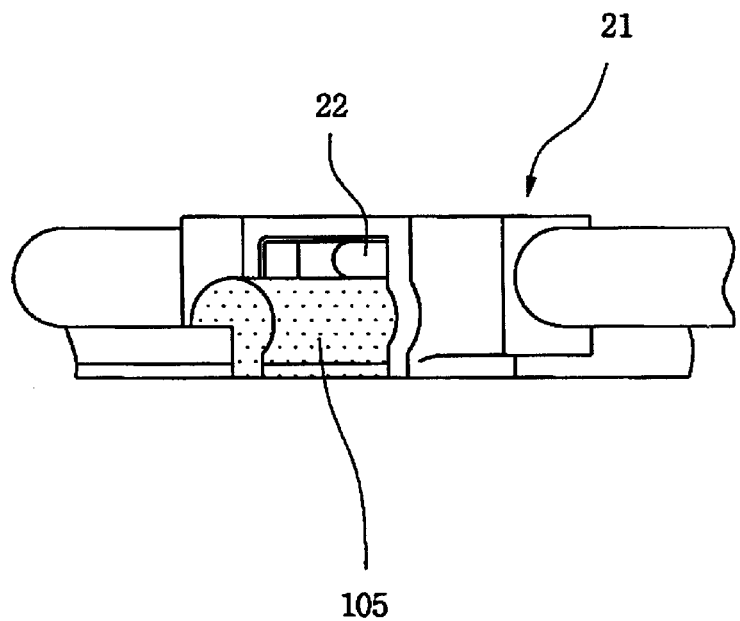

The arm motor 33 is then operated and the position of the working arm 30 is controlled leftward or rightward. The jig 22 of the weather strip holder 21, as shown in FIG. 4c, firmly holds the one end of the weather strip 105.

As described above, when the jig 22 of the holder 21 holds one end of the weather strip 105, the holder 21 is rotated by the rotation of the motor 33.

Figure 4E:
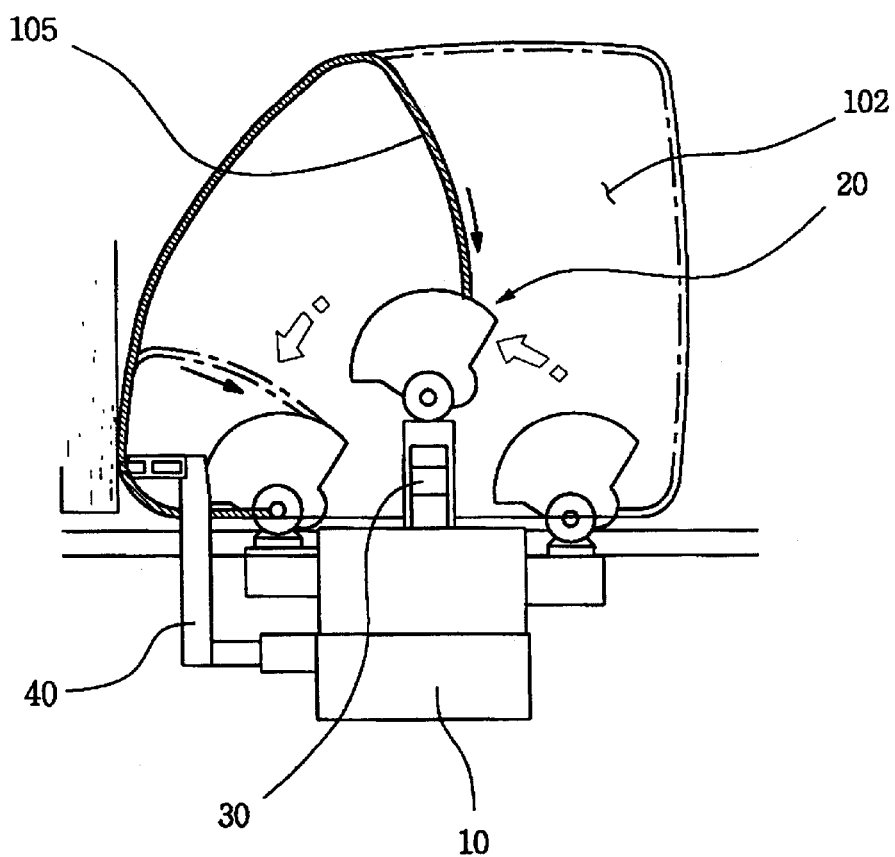
FIG. 4e shows the state that the weather strip is removed by the weather strip holder pivoting around a main body of the apparatus in accordance with the present invention.

As shown in FIG. 4e, since the holder 21 holding an end of the weather strip 105 is rotated, the weather strip 105 is pulled and detached from the body of the automobile. The detached weather strip 105 is thereby wound on the weather strip holder 21.

Since the arm motor 33 is operated, the working arm 30 moves along the weather strip 105 and the detaching work of the weather strip 105 is continued.

Finally, when the entire weather strip 105 is completely detached from the door frame of the automobile, the moving means 50 transports the main body back to the original position, finishing the task. The weather strip 105 wound on the holder 21 is collected for recycling.

As described above, the apparatus in accordance with the present invention can automatically detach a weather strip from the body of a discarded automobile, thereby reducing the cost of labor hours versus removal by hand.

Furthermore, the apparatus in accordance with the present invention allows for recycling of the removed weather strip, thereby reducing the waste of resources and pollution to the environment.

What is claimed is:

1. An apparatus for dismantling a weather strip from the door opening of a discarded automobile comprising:

a main control body;

a working arm pivotally mounted on the main control body;

a weather strip remover mounted at the end of the working arm, for pulling the weather strip and detaching it from the body of the automobile;

an arm supporter supporting the main control body relative to the door frame of the automobile; and a movable means for transporting the main body with the weather strip remover and the working arm to a working area.

2. The apparatus for dismantling a weather strip from the door opening of a discarded automobile according to claim 1, wherein the weather strip remover comprises a weather strip holder pivotally mounted on the end of the working arm for holding one end of the weather strip and pulling it, a motor mounted on the end of the working arm for pivoting the weather strip holder, and a cover covering the weather strip holder.

3. The apparatus for dismantling a weather strip from the door opening of a discarded automobile according to claim 1, wherein the working arm is folded with two arm elements that are connected pivotally, through which the arm motor makes the weather strip remover turn around 180° about the main body.

* * * * *